(12) United States Patent
Yang

(10) Patent No.: US 8,077,271 B2
(45) Date of Patent: Dec. 13, 2011

(54) BACKLIGHT UNIT AND LIQUID CRYSTAL DISPLAY USING THE SAME

(75) Inventor: Shinwoo Yang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 455 days.

(21) Appl. No.: 12/314,523

(22) Filed: Dec. 11, 2008

(65) Prior Publication Data

US 2009/0167982 A1   Jul. 2, 2009

(30) Foreign Application Priority Data

Dec. 27, 2007  (KR) .......................... 10-2007-0138311

(51) Int. Cl.
*G02F 1/1335*  (2006.01)
*G02F 1/1333*  (2006.01)

(52) U.S. Cl. ............. 349/61; 349/58; 349/67; 362/97.2; 362/634

(58) Field of Classification Search .................... 349/61, 349/67, 58; 362/632–634, 97.2
See application file for complete search history.

(56) References Cited

U.S. PATENT DOCUMENTS

| | | | |
|---|---|---|---|
| 2005/0073858 A1* | 4/2005 | Kim et al. | ...................... 362/561 |
| 2005/0141212 A1 | 6/2005 | Moon et al. | |
| 2007/0126948 A1* | 6/2007 | Kim et al. | ....................... 349/61 |

FOREIGN PATENT DOCUMENTS

| | | |
|---|---|---|
| CN | 1567061 | 1/2005 |
| CN | 1637522 | 7/2005 |
| CN | 1916721 | 2/2007 |

* cited by examiner

*Primary Examiner* — Nathanael R Briggs
(74) *Attorney, Agent, or Firm* — McKenna Long & Aldridge

(57) ABSTRACT

A backlight unit and a liquid crystal display using the backlight unit are disclosed. The backlight unit includes a plurality of lamps, a lower cover whose an upper portion has an opening, a lamp guide, and an optical member on the lamps. The lamps are positioned in an inside space of the lower cover. The lamp guide includes a first support unit on a surface of the inside space of the lower cover, holder units that are positioned on an upper surface of the first support unit to hold the lamps, a second support unit that is positioned on the upper surface of the first support unit to support the optical member, and a fastening unit fastening the first support unit to the lower cover. The first support unit includes a projection for increasing a reflective area.

11 Claims, 4 Drawing Sheets

BACKLIGHT UNIT AND LIQUID CRYSTAL DISPLAY USING THE SAME

This application claims priority from Korean Patent Application No. 2007-0138311, filed on Dec. 27, 2007, the contents of which is hereby incorporated by reference for all purposes as if fully set forth herein.

BACKGROUND OF THE INVENTION

1. Field of the Invention

The present invention relates to a backlight unit and a liquid crystal display using the backlight unit, and more particularly, to a backlight unit including a lamp guide and a liquid crystal display using the backlight unit.

2. Discussion of the Related Art

Liquid crystal displays have been used in notebook personal computers, office automatic equipments, audio/video equipments, etc. because of advantages such as miniaturization, thin profile, and low power consumption.

A liquid crystal display includes a liquid crystal display module and a backlight unit. The backlight unit may be classified into an edge type backlight unit and a direct-under type backlight unit depending on a location of a light source.

In the edge type backlight unit, a light source is positioned at an edge of a light guide plate. While light produced by the light source is repeatedly reflected inside the light guide plate, the light is emitted to the liquid crystal display module through a main surface of the light guide plate.

In the direct-under type backlight unit, a plurality of light sources is parallelly positioned under the liquid crystal display module, a reflective plate is positioned under the light sources, and a diffuser plate is positioned on the light sources. Light produced by the light sources is emitted to the liquid crystal display module through the diffuser plate.

Because the number of light sources in the direct-under type backlight unit increases as compared with the number of light sources in the edge type backlight unit, the direct-under type backlight unit can achieve a high luminance of an image.

Examples of lamps used in the direct-under type backlight unit include a cold cathode fluorescent lamp (CCFL), an external electrode fluorescent lamp (EEFL), and a light emitting diode (LED).

As the screen size of the liquid crystal display increases, lengths of the cold cathode fluorescent lamp and the external electrode fluorescent lamp become longer in proportion to the screen size of the liquid crystal display. However, because the cold cathode fluorescent lamp and the external electrode fluorescent lamp are manufactured in a cylinder shape having a very small diameter, the hang down phenomenon of the lamps occurs because of the weight of the lamps as the lengths of the lamps lengthen.

Further, as the screen size of the liquid crystal display increases, a size of the diffuser plate, that is positioned on the lamp to uniformly diffuse light coming from the lamp on the entire surface of the liquid crystal display panel, and sizes of optical sheets, that focuses light emitted from the diffuser plate on a liquid crystal display panel, increase. Therefore, a hang down phenomenon occurs in the diffuser plate and the optical sheets.

The backlight unit emits light having the non-uniform luminance distribution and non-uniform optical characteristics to the liquid crystal display panel because of the lamps, the diffuser plate, and the optical sheets in which the hang down phenomenon partially occurs. Hence, the display quality of the liquid crystal display is reduced.

A related art backlight unit, as shown in FIGS. 7 and 8, includes a lamp guide positioned on a hang down portion so as to prevent the hang down phenomenon.

FIG. 7 is a perspective view of a related art lamp guide, and FIG. 8 is a cross-sectional view schematically showing a liquid crystal display including a backlight unit including the related art lamp guide shown in FIG. 7.

As shown in FIGS. 7 and 8, the related art backlight unit includes a lower cover 10, a reflective plate 20, a lamp guide 30, a plurality of lamps 40, and an optical member 50 including a diffuser plate 51 and a plurality of optical sheets 53.

The lower cover 10 has a receptacle structure capable of receiving the plurality of lamps 40 in an inside space of the lower cover 10, and the reflective plate 20 is positioned on a surface of the inside space.

As described above, the lamps 40 are formed in a cylinder shape of a cold cathode fluorescent lamp or an external electrode fluorescent lamp to produce light. The light produced by the lamps 40 is incident on the diffuser plate 51 by the reflective plate 20.

The diffuser plate 51 includes a plurality of beads and scatters the light using the beads.

The optical sheets 53 include one or more diffuser sheets and one or more prism sheets. The optical sheets 53 uniformly emit the light coming from the diffuser plate 51 on the entire display surface of a liquid crystal display panel 60, and focus the light on the entire display surface by changing a traveling path of the light in a direction perpendicular to the display surface of the liquid crystal display panel 60.

The lamp guide 30 is used to hold the two or more lamps and includes holder units 31, a first support unit 35, a second support unit 33, and a fastening unit 37.

The holder unit 31 surrounds a circular portion of the lamp 40 and has an opening into which the lamp 40 is inserted.

The lamp guide 30 includes at least one second support unit 33. The second support unit 33 has a cone shape so that an area of the second support unit 33 contacting the diffuser plate 51 is minimized.

The first support unit 35 is formed in the form of a pedestal so that the lamp guide 30 is supported in the inside space of the lower cover 10 in which the reflective plate 20 is formed. The holder units 31 and the second support unit 33 are formed on the first support unit 35. Because the two or more holder units 31 are formed on the first support unit 35 so as to hold the different lamps 40, the first support unit 35 extends in a direction perpendicular to a longitudinal direction of the lamps 40.

The fastening unit 37 is inserted into a hole (not shown) passing through the lower cover 10 and the reflective plate 20 to fasten the lamp guide 30 to the lower cover 10 and the reflective plate 20.

The related art backlight unit can solve the hang-down phenomenon of the lamp 40 and the hang-down phenomenon of the optical member 50 including the diffuser plate 51 and the optical sheets 53 using the lamp guide 30.

The lamp guide 30 is formed of a reflective material capable of reflecting the light produced by the lamp 40. In case the lamp guide 30 does not reflect the light produced by the lamp 40, Mura occurs at a formation position of the lamp guide 30.

However, the lamp guide 30 is generally formed of a material whose a reflectance is smaller than a reflectance of the reflective plate 20. Therefore, in an initial drive stage of the lamp 40, the amount of light reflected by the lamp guide 30 is relatively less than the amount of light reflected by the reflective plate 20 and the amount of direct light generated in the lamp 40. Hence, Mura occurs at the formation position of the lamp guide 30.

As above, although the lamp guide is formed of the reflective material, Mura is not prevented from occurring in the initial drive stage of the lamp.

SUMMARY OF THE INVENTION

Accordingly, the present invention is directed to a backlight unit and liquid crystal display using the same that substantially obviates one or more of the problems due to limitations and disadvantages of the related art.

An advantage of the present invention is to provide a backlight unit including a lamp guide capable of preventing the occurrence of Mura and minimizing a friction noise of a lamp caused by a shake of the lamp guide.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a plurality of lamps, a lower cover whose an upper portion has an opening, the lamps being positioned in an inside space of the lower cover, a lamp guide that allows the lamps to be positioned in the inside space of the lower cover, and an optical member on the lamps, wherein the lamp guide includes a first support unit positioned on a surface of the inside space of the lower cover, the first support unit including a projection for increasing a reflective area, holder units that are positioned on an upper surface of the first support unit to hold the lamps, a second support unit that is positioned on the upper surface of the first support unit to support the optical member, and a fastening unit that fastens the first support unit to the lower cover.

The projection may include hemispherical embossing projections.

The holder units may be positioned at ends of the first support unit in a longitudinal direction of the first support unit with the second support unit interposed between the holder units. The projection may have a line pattern connecting the holder units to the second support unit in a row. The line pattern projection may have a triangular section or a semicircular section.

The projection includes the line pattern projection and hemispherical embossing projections around the line pattern projection.

The optical member may include a diffuser plate that covers the opening of the lower cover to diffuse light coming from the lamps, and an optical sheet on the diffuser plate. The optical sheet may include at least one prism sheet for changing a traveling path of light coming from the diffuser plate and at least one diffuser sheet for diffusing the light coming from the diffuser plate.

The backlight unit may further comprise a reflective plate attached to the surface of the inside space of the lower cover.

The second support unit may have a smaller width as it goes from a lower portion to an upper portion thereof.

The backlight unit having the above-described configuration may be used in a liquid crystal display including a liquid crystal display panel.

Because the backlight unit having the above-described configuration increases the light reflective area of the lamp guide using the projection, Mura can be prevented from occurring in an initial drive stage of the lamp.

Because the line pattern projection improves strength of the first support unit, a shake of the lamp guide can be suppressed. Hence, a noise caused by a friction between the lamp and the lamp guide during the shake of the lamp guide can be minimized.

In the liquid crystal display including the backlight unit having the above-described configuration, problems of Mura and noise can be solved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
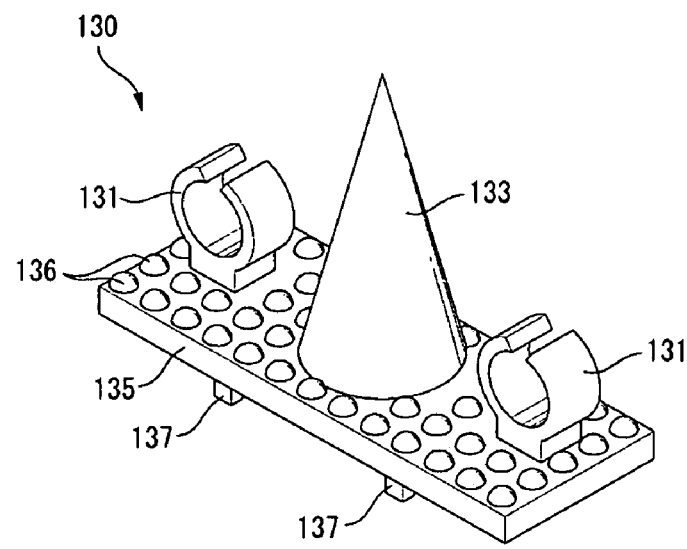
FIG. 1 is a perspective view of a lamp guide according to a first exemplary embodiment of the present invention.

Reference will now be made in detail to embodiments of the present invention, examples of which are illustrated in the accompanying drawings.

In the drawings, the thickness of layers and regions are exaggerated for clarity. To facilitate understanding, identical reference numerals have been used, where possible, to designate identical elements that are common to the figures. It will also be understood that when a layer is referred to as being "on" another layer or substrate, it can be directly on the other layer or substrate or intervening layers may also be present.

First Exemplary Embodiment

A first exemplary embodiment of the present invention will be described in detail with reference to FIGS. 1 and 2.

Figure 2:
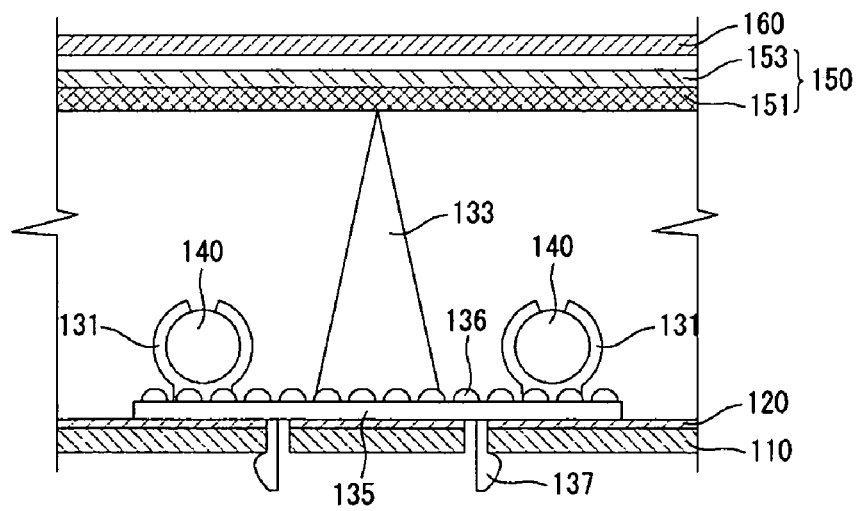
FIG. 2 is a cross-sectional view schematically showing a backlight unit and a liquid crystal display using the lamp guide of FIG. 1.

FIG. 1 is a perspective view of a lamp guide according to the first exemplary embodiment of the invention, and FIG. 2 is a cross-sectional view schematically showing a backlight unit and a liquid crystal display using the lamp guide of FIG. 1.

As shown in FIGS. 1 and 2, the liquid crystal display includes a liquid crystal display panel 160 and a backlight unit providing light to the liquid crystal display panel 160.

A plurality of data lines and a plurality of gate lines are arranged on the liquid crystal display panel 160 to cross each other. Liquid crystal cells are arranged between an upper substrate and a lower substrate of the liquid crystal display panel 160 in an active matrix format.

The liquid crystal display panel 160 includes pixel electrodes and common electrodes for applying an electric field to each of the liquid crystal cells. A thin film transistor is formed at each of crossings of the plurality of data lines and the plurality of gate lines for switching a data voltage applied to the pixel electrode in response to a scan signal.

Gate driver integrated circuits and data driver integrated circuits are electrically connected to the liquid crystal display panel 160 through a tape carrier package.

The backlight unit includes a lower cover 110, a reflective plate 120, a lamp guide 130, a plurality of lamps 140, and an optical member 150.

The lower cover 110 has a receptacle structure capable of receiving the plurality of lamps 140 in an inside space of the lower cover 110, and the reflective plate 120 is attached to a top surface and a side surface of the inside space.

The lamps 140 is configured in a cylinder shape of a cold cathode fluorescent lamp or an external electrode fluorescent lamp, and light produced by the lamps 140 is incident on the optical member 150 by the reflective plate 120.

The optical member 150 includes a diffuser plate 151 and optical sheets 153. The diffuser plate 151 includes a plurality of beads for scattering light.

The optical sheets 153 include one or more diffuser sheets and one or more prism sheets. The one or more diffuser sheets uniformly emit the light coming from the diffuser plate 151 on the entire display surface of the liquid crystal display panel 160. The one or more prism sheets focus the light on the entire display surface by changing a traveling path of the light in a direction perpendicular to the display surface of the liquid crystal display panel 160.

The lamp guide 130 includes holder units 131, a first support unit 135, a second support unit 133, a projection 136, and a fastening unit 137.

The holder unit 131 surrounds a circular portion of the lamp 140 and has an opening into which the lamp 140 is inserted.

The lamp guide 130 includes at least one second support unit 133. The second support unit 133 has a cone shape so that an area of the second support unit 133 contacting the diffuser plate 151 is minimized.

The first support unit 135 is formed in the form of a pedestal so that the lamp guide 130 is supported in the inside space of the lower cover 110 in which the reflective plate 120 is positioned. The holder units 131 are formed at ends of the first support unit 135 with the second support unit 133 interposed between the holder units 131. Because the two or more holder units 131 are formed so as to hold the different lamps 40, the first support unit 135 extends in a direction perpendicular to a longitudinal direction of the lamps 140.

The lamp guide 130 is formed of a reflective material capable of reflecting the light produced by the lamp 140 toward the optical member 150. The first support unit 135 has a projection for increasing a reflective area.

The first support unit 135, as shown in FIGS. 1 and 2, includes the projections 136 having a hemispherical embossing pattern so as to increase the reflective area of the first support unit 135. The lamp guide 130 including the embossing projections 136 can increase the amount of light reflected toward the optical member 150. Because the embossing projection 136 has the hemispherical shape, the scattering and diffusion effects of light can be obtained.

The fastening unit 137 is inserted into a hole (not shown) passing through the lower cover 110 and the reflective plate 120 to fasten the lamp guide 130 to the lower cover 110 and the reflective plate 120.

The backlight unit having the above-described configuration and the liquid crystal display using the backlight unit according to the first exemplary embodiment can solve a hang down phenomenon of the lamp 140 and the optical member 150.

Further, the occurrence of Mura can be prevented at a formation position of the lamp guide 130 in an initial drive stage of the lamp 140.

Second Exemplary Embodiment

A second exemplary embodiment of the invention will be described in detail with reference to FIGS. 3 to 5.

Figure 3:
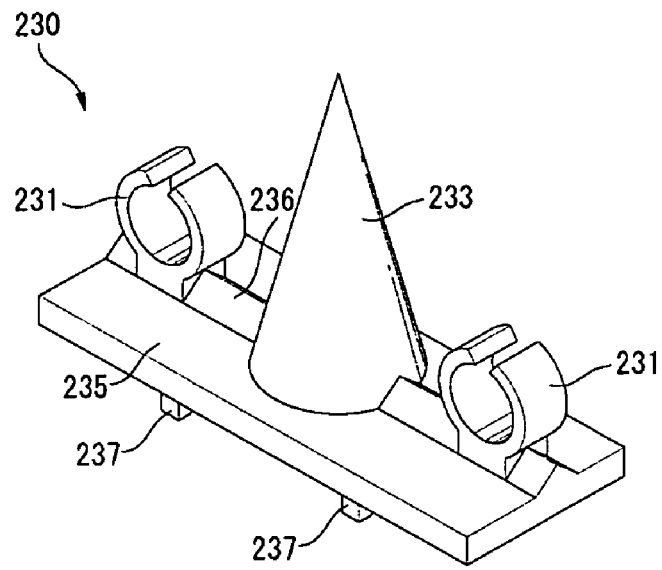
FIG. 3 is a perspective view of a lamp guide of a backlight unit according to a second exemplary embodiment of the present invention.
Figure 4:
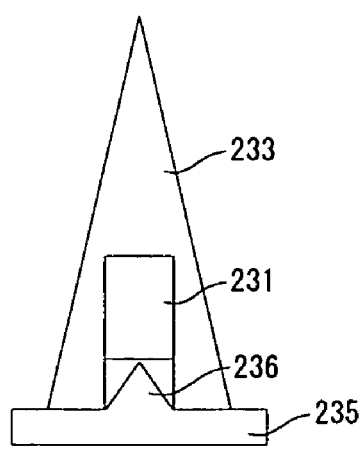
FIG. 4 is a side view of the lamp guide according to the second exemplary embodiment of the present invention.
Figure 5:
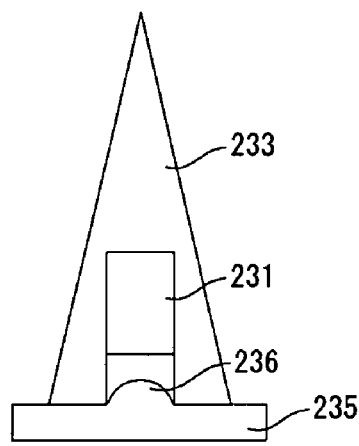
FIG. 5 is a side view of the lamp guide including a projection having another line pattern.

FIG. 3 is a perspective view of a lamp guide of a backlight unit according to the second exemplary embodiment of the invention, FIG. 4 is a side view of the lamp guide according to the second exemplary embodiment of the invention, and FIG. 5 is a side view of the lamp guide including a projection having another line pattern.

Since structures and components in the second exemplary embodiment are the same as those in the first exemplary embodiment except the projection, the description thereabout is briefly made or is entirely omitted.

In the backlight unit according to the second exemplary embodiment of the invention, a first support unit 235 of a lamp guide 230 includes a projection 236 having a line pattern. The holder units 231 are positioned at ends of the first support unit 235 in a longitudinal direction of the first support unit 235 with a second support unit 233 interposed between the holder units 231. The line pattern is a pattern of a form connecting the second support unit 233 to the holder units 231 in a row.

As shown in FIGS. 4 and 5, the line pattern projection 236 has a triangular section or a semicircular section.

As above, the lamp guide 230 including the line pattern projection 236 can efficiently enhance strength of the first support unit 235. Hence, a friction noise of a lamp caused by a shake of the lamp guide 230 can be minimized.

Third Exemplary Embodiment

A third exemplary embodiment of the invention will be described in detail with reference to FIG. 6.

Figure 6:
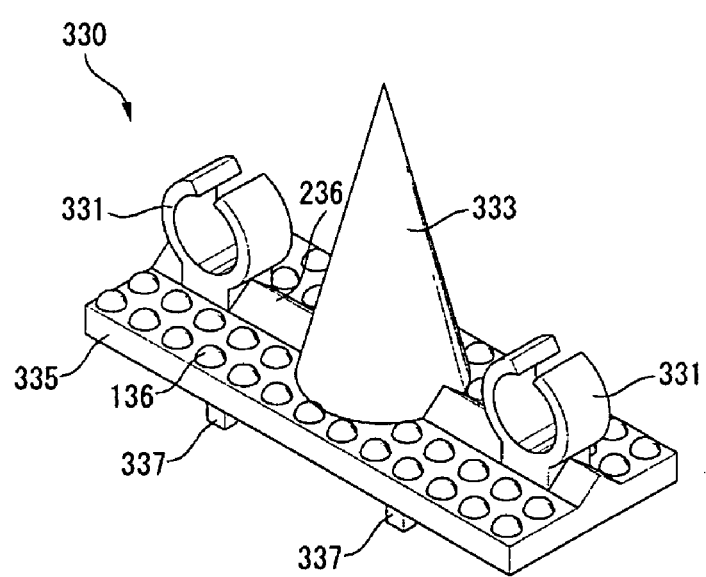
FIG. 6 is a perspective view of a lamp guide of a backlight unit according to a third exemplary embodiment of the present invention.
Figure 7:
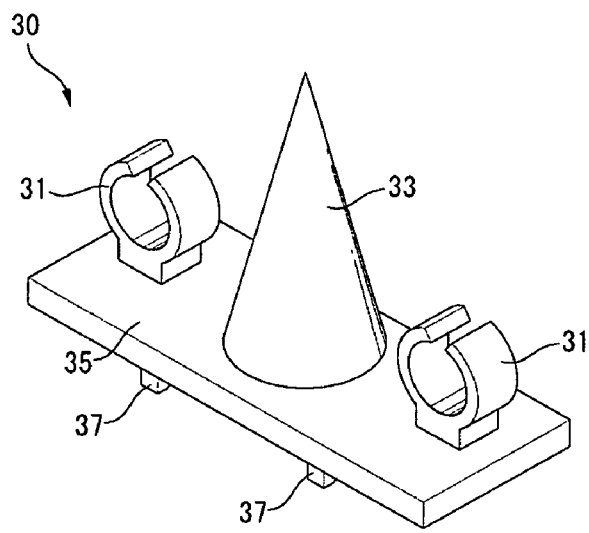
FIG. 7 is a perspective view of a related art lamp guide.
Figure 8:
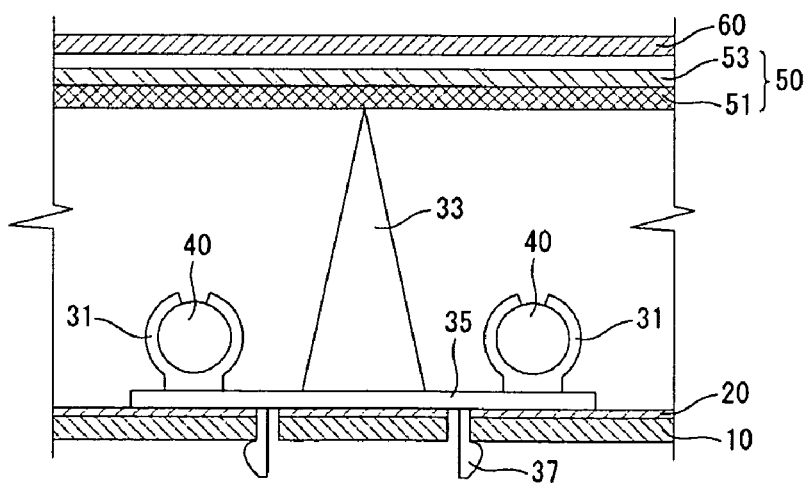
FIG. 8 is a cross-sectional view schematically showing a liquid crystal display including a backlight unit including the related art lamp guide shown in FIG. 7.

FIG. 6 is a perspective view of a lamp guide 330 of a backlight unit according to a third exemplary embodiment of the invention. Since structures and components in the third exemplary embodiment are the same as those in the first and second exemplary embodiments except that a line pattern projection 236 and embossing projections 136 are formed on an upper surface of a first support unit 335, the description thereabout is briefly made or is entirely omitted. In FIG. 6, reference numerals 331 and 333 indicate a holder unit and a second support unit, respectively.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit comprising:
   a plurality of lamps;
   a lower cover whose an upper portion has an opening, the lamps being positioned in an inside space of the lower cover;
   a lamp guide that allows the lamps to be positioned in the inside space of the lower cover; and
   an optical member on the lamps,
   wherein the lamp guide includes:
   a first support unit positioned on a surface of the inside space of the lower cover, the first support unit including a projection for increasing a reflective area;
   holder units that are positioned on an upper surface of the first support unit to hold the lamps;
   a second support unit that is positioned on the upper surface of the first support unit to support the optical member; and
   a fastening unit that fastens the first support unit to the lower cover,
   wherein the holder units are positioned at ends of the first support unit in a longitudinal direction of the first support unit with the second support unit interposed between the holder units, and
   wherein the projection has a line pattern connecting the holder units to the second support unit in a row.

2. The backlight unit of claim 1, wherein the line pattern projection has a triangular section or a semicircular section.

3. The backlight unit of claim 1, wherein the projection further includes hemispherical embossing projections around the line pattern projection.

4. The backlight unit of claim 1, wherein the optical member includes:
   a diffuser plate that covers the opening of the lower cover to diffuse light coming from the lamps; and
   an optical sheet on the diffuser plate.

5. The backlight unit of claim 4, further comprising a reflective plate attached to the surface of the inside space of the lower cover.

6. The backlight unit of claim 5, wherein the second support unit has a smaller width as it goes from a lower portion to an upper portion thereof.

7. A liquid crystal display comprising:
   a liquid crystal display panel; and
   a backlight unit including:
   a plurality of lamps;
   a lower cover whose an upper portion has an opening, the lamps being positioned in an inside space of the lower cover;
   a lamp guide that allows the lamps to be positioned in the inside space of the lower cover; and
   an optical member on the lamps,
   wherein the lamp guide includes:
   a first support unit positioned on a surface of the inside space of the lower cover, the first support unit including a projection for increasing a reflective area;
   holder units that are positioned on an upper surface of the first support unit to hold the lamps;
   a second support unit that is positioned on the upper surface of the first support unit to support the optical member; and
   a fastening unit that fastens the first support unit to the lower cover,
   wherein the holder units are positioned at ends of the first support unit in a longitudinal direction of the first support unit with the second support unit interposed between the holder units, and
   wherein the projection has a line pattern connecting the holder units to the second support unit in a row.

8. The liquid crystal display of claim 7, wherein the line pattern projection has a triangular section or a semicircular section.

9. The liquid crystal display of claim 7, further comprising a reflective plate attached to a bottom surface and a side surface of the inside space of the lower cover.

10. The liquid crystal display of claim 9, wherein the second support unit has a smaller width as it goes from a lower portion to an upper portion thereof.

11. The liquid crystal display of claim 10, wherein the fastening unit includes a clamp member, and the lower cover and the reflective plate have a hole into which the clamp member is inserted.

* * * * *